(12) United States Patent
Ran

(10) Patent No.: US 7,097,222 B2
(45) Date of Patent: Aug. 29, 2006

(54) VEHICLE ANTI-CRASH SAFETY DEVICE

(76) Inventor: Xiaocheng Ran, 1415 S. Marengo Ave., #E, Alhambra, CA (US) 91803

( * ) Notice: Subject to any disclaimer, the term of this patent is extended or adjusted under 35 U.S.C. 154(b) by 116 days.

(21) Appl. No.: 10/871,314

(22) Filed: Jun. 18, 2004

(65) Prior Publication Data

US 2005/0280282 A1 Dec. 22, 2005

(51) Int. Cl.
*B60R 19/42* (2006.01)
(52) U.S. Cl. .................. 293/137; 293/102; 293/124; 293/129
(58) Field of Classification Search ............ 293/102, 293/107, 108, 109, 120, 124, 129, 132, 135, 293/137, 138, 145
See application file for complete search history.

(56) References Cited

U.S. PATENT DOCUMENTS

| | | | | | |
|---|---|---|---|---|---|
| 1,414,211 | A | * | 4/1922 | Rosenberg | 293/137 |
| 1,414,930 | A | * | 5/1922 | Batchelor | 293/137 |
| 1,449,210 | A | * | 3/1923 | Anderson | 293/137 |
| 1,467,640 | A | * | 9/1923 | Ilich | 293/125 |
| 1,564,488 | A | * | 12/1925 | Nastri | 293/137 |
| 1,696,429 | A | * | 12/1928 | Christen | 293/120 |
| 1,783,875 | A | * | 12/1930 | Ferdinand | 293/120 |
| 1,832,184 | A | * | 11/1931 | Christen | 293/136 |
| 2,466,265 | A | * | 4/1949 | Noonan | 293/26 |
| 3,361,467 | A | * | 1/1968 | Ludwikowski | 293/136 |
| 6,217,090 | B1 | * | 4/2001 | Berzinji | 293/132 |

* cited by examiner

*Primary Examiner*—Lori L. Coletta
(74) *Attorney, Agent, or Firm*—Raymond Y. Chan; David & Raymond Patent Group

(57) ABSTRACT

An anti-crash safety device includes a supporting frame for securely mounting to a vehicle body and an impact rebounding unit which includes at least a resilient reinforcing member supported by the supporting frame at a position spaced apart from the vehicle body for shielding at least a portion of the vehicle body and at least a shock absorbing element rearwardly extended from the resilient reinforcing member. The resilient reinforcing member is adapted to retain a restoring force for bounding an impact force away from the vehicle body when the impact force is applied on the resilient reinforcing member. The shock absorbing element is adapted for applying an urging force to absorb the impact force from the resilient reinforcing member so as to minimize the impact force transmitting from the resilient reinforcing member to the vehicle body and to protect the vehicle body from being crashed by the impact force.

11 Claims, 6 Drawing Sheets

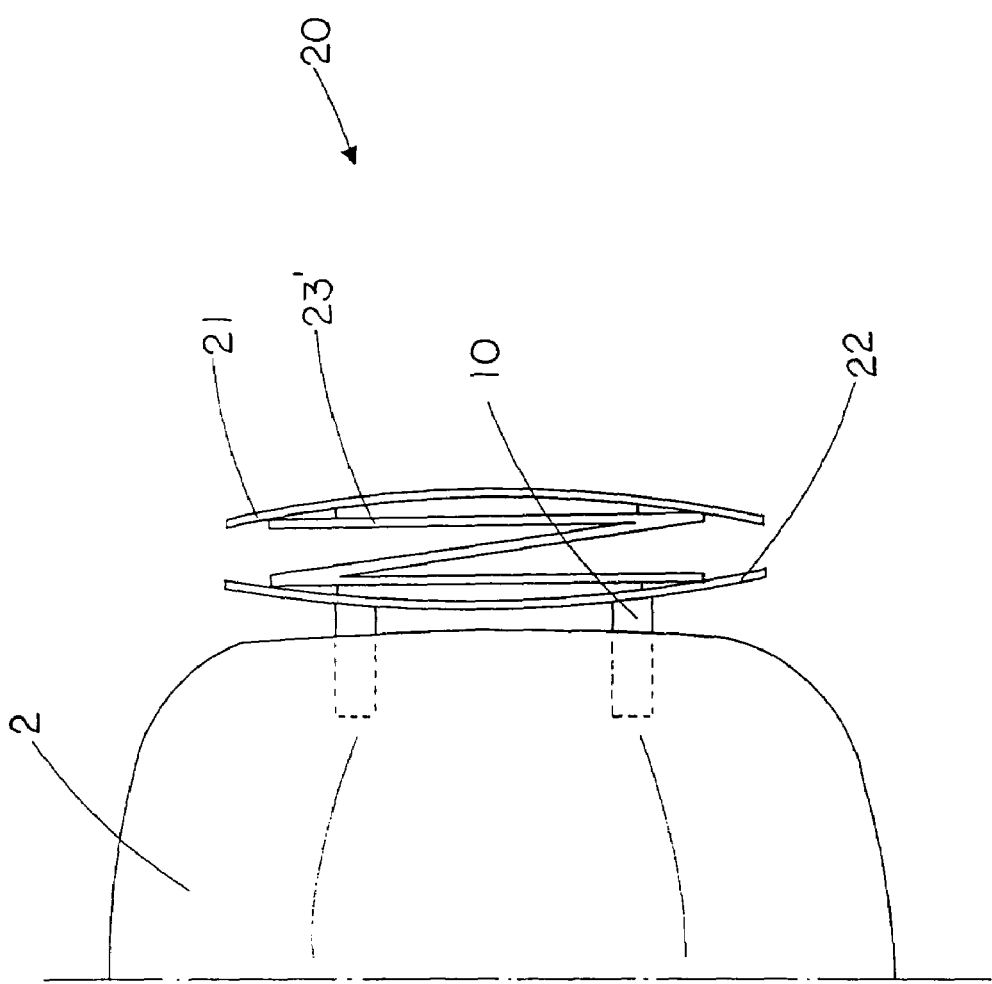

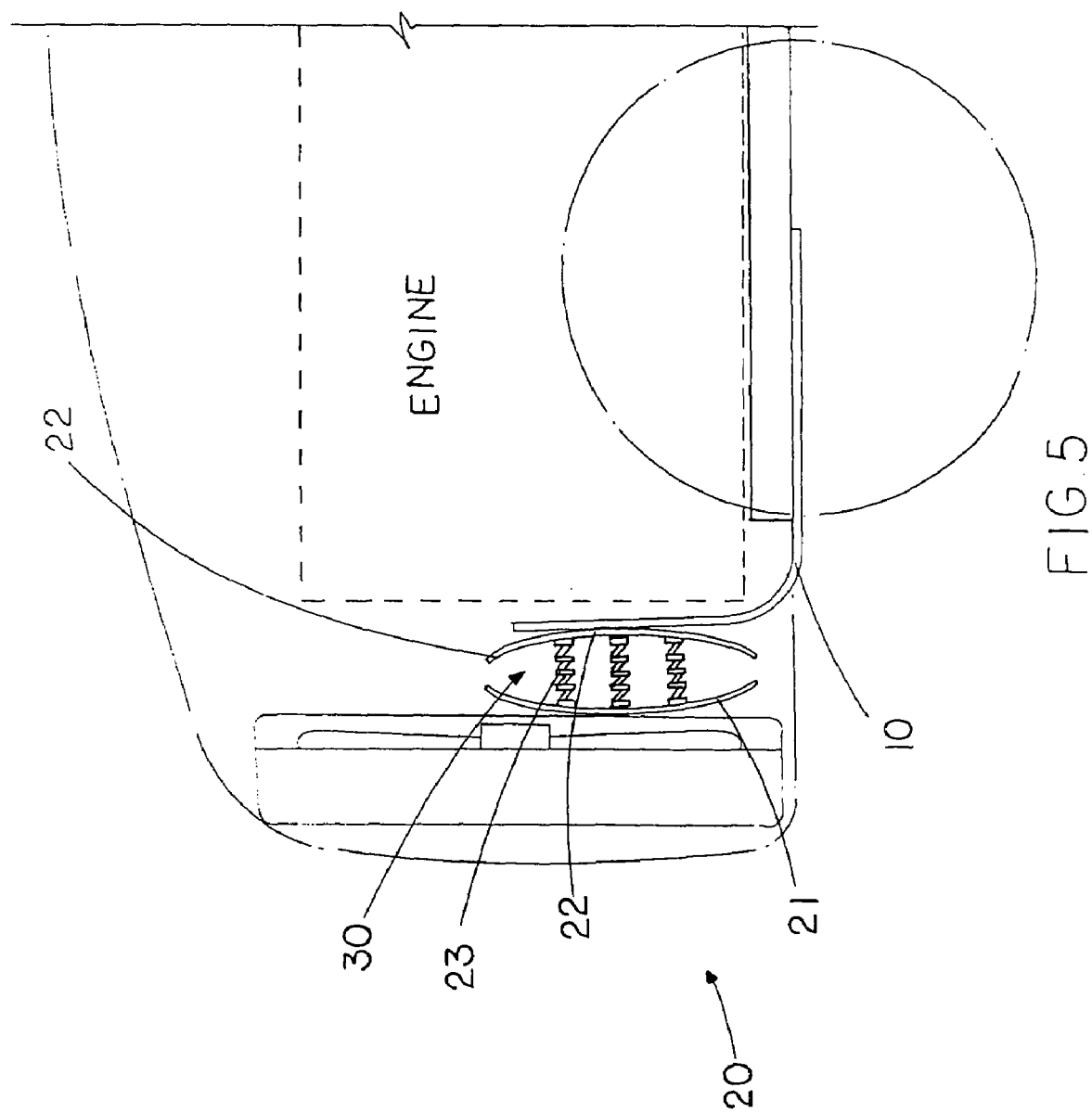

VEHICLE ANTI-CRASH SAFETY DEVICE

BACKGROUND OF THE PRESENT INVENTION

1. Field of Invention

The present invention relates to safety device for vehicles and, more particularly to an anti-crash safety device which is a combination of a conventional bumper and a shock absorber for simultaneously absorbing the impact force and bouncing the impact force back so as to protect the vehicle as well as guarantee the maximum safety of the vehicle occupants.

2. Description of Related Arts

The most popular anti-crash devices for a vehicle are bumpers. As its name implies, a bumper is a part of car designed to withstand the impact from collisions. Most bumpers were shields made of rubber, but increasingly bumpers are made of metal, that are mounted on the front and rear of a passenger car. When a low speed collision occurs, the bumper system absorbs the shock to prevent or reduce damage to the car. Some bumpers use energy absorbs or brackets and others are made with a foam cushioning materials.

Commonly, the typical vehicle bumpers comprise a primarily plastic and/or steel construction designed for elastic deformation up to an impact. These bumpers are typically designed to prevent or reduce physical damage to the front and rear ends of passenger motor vehicles in low-speed collisions, not designed to be structural components that would significantly contribute to vehicle crashworthiness or occupant protection during front or rear collisions. In other words, the bumper is not a safety feature intended to prevent or mitigate injury severity to occupants in the passenger cars. This is to say that a bumper is not suitable for overcoming a high energy impact, for example, a severe collision of a high-speed running car. They are merely designed for preventing slight collision or vehicle body scratches of parking impact, such as protecting the hood, trunk, grille, fuel, exhaust and cooling system as well as safety related equipment such as parking lights, headlamps and taillights in low speed collisions.

Nowadays, people of our society are highly aware of security issues. As a result, the trucks and SUVs having a tough outlook shape began to dominate the roads in last decade. Out of question, these kinds of tough vehicles have higher chassis as well as enlarged bumper. Furthermore, the advent of SUVs has led to the installation of large metal grills as part of a vehicle's bumper, increasing the damage caused on other vehicles/cyclists/pedestrians in a collision. It is largely because of such enlarged bumpers that SUVs are twice as likely to kill pedestrians they hit as are cars at equal speeds. So, the conventional bumper is out of time since the performance in safety perspective is not qualified anymore. For example, if a sedan with conventional bumper collides with a SUV equipped with a metal bumper, the sedan's bumper are not able to protect the vehicle from being crashed since the SUVs' bumper is in a higher elevation and intensified performance.

What is more, since the bumper are made of rigid materials, such as steel and utility plastics, the principle function of the bumper is functioned as a buffer zone for preventing the vehicle from direct contact with other objects. This is to say the conventional bumper could not absorb the shock caused by a severe collision. Inclusively, the SUVs installed metal grilled bumper could not absorb the impact shock either. However, the serious shock could result to long term personal injury, even to an extent, death. As a result, it is highly desirable to develop a kind of bumper, which is shock absorbable and ultimate safe.

SUMMARY OF THE PRESENT INVENTION

A main object of the present invention is to provide an anti-crash safety device for a vehicle, wherein the anti-crash safety device is adapt for simultaneously absorbing the impact force by offsetting the impact force so as to protect the vehicle.

Another object of the present invention is to provide an anti-crash safety device for a vehicle, wherein the anti-crash safety device not only protects the vehicle from low speed slight collision, but also minimize the damage from a high speed collision.

Another object of the present invention is to provide an anti-crash safety device for a vehicle, wherein the anti-crash safety device is self-restoring after collision, such as parking impact, so the repair is normally not required.

Another object of the present invention is to provide an anti-crash safety device for a vehicle, wherein the shape, size as well as the protecting intensity of the anti-crash safety device is adjustable so that the safety device could be installed in different kinds of car.

Another object of the present invention is to provide an anti-crash safety device for a vehicle, wherein no complicated structure and parts are required to fulfill above mentioned functions.

Accordingly, to achieve above mentioned objects, the present invention provide an anti-crash safety device for a vehicle having a vehicle body, the anti-crash safety device comprises:

a supporting frame adapted for securely mounting to the vehicle body; and an impact rebounding unit, which is supported by the supporting frame, comprising:

at least a resilient reinforcing member positioned spaced apart from the vehicle body and defining a receiving cavity between the resilient reinforcing member and the vehicle body for shielding at least a portion of the vehicle body, wherein the resilient reinforcing member is adapted to retain a restoring force for bounding an impact force away from the vehicle body when the impact force is applied on the resilient reinforcing member; and at least a shock absorbing element rearwardly extended from the resilient reinforcing member within the receiving cavity, wherein the shock absorbing element is adapted for applying an urging force to absorb the impact force from the resilient reinforcing member so as to minimize the impact force transmitting from the resilient reinforcing member to the vehicle body and to protect the vehicle body from directly being crashed by the impact force.

These and other objectives, features, and advantages of the present invention will become apparent from the following detailed description, the accompanying drawings, and the appended claims.

BRIEF DESCRIPTION OF THE DRAWINGS

FIG. 4 is a top view of an alternative mode of anti-crash safety device according to the above preferred embodiment of the present invention.

FIG. 5 is a sectional view showing the anti-crash safety device installed inside the vehicle body for protecting the engine according to the above preferred embodiment of the present invention.

DETAILED DESCRIPTION OF THE PREFERRED EMBODIMENT

Figure 1:
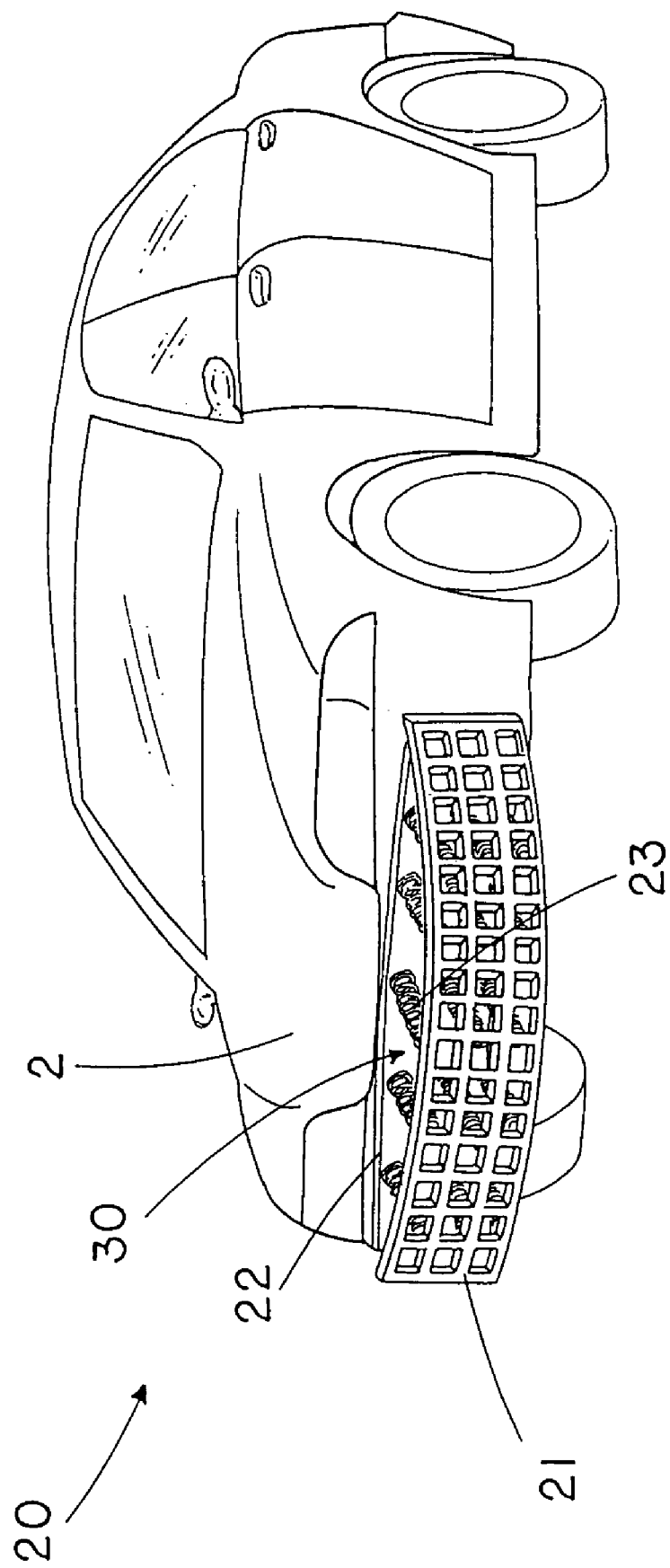
FIG. 1 is a perspective view of an anti-crash safety device installed on a vehicle according to a preferred embodiment of the present invention.
Figure 2:
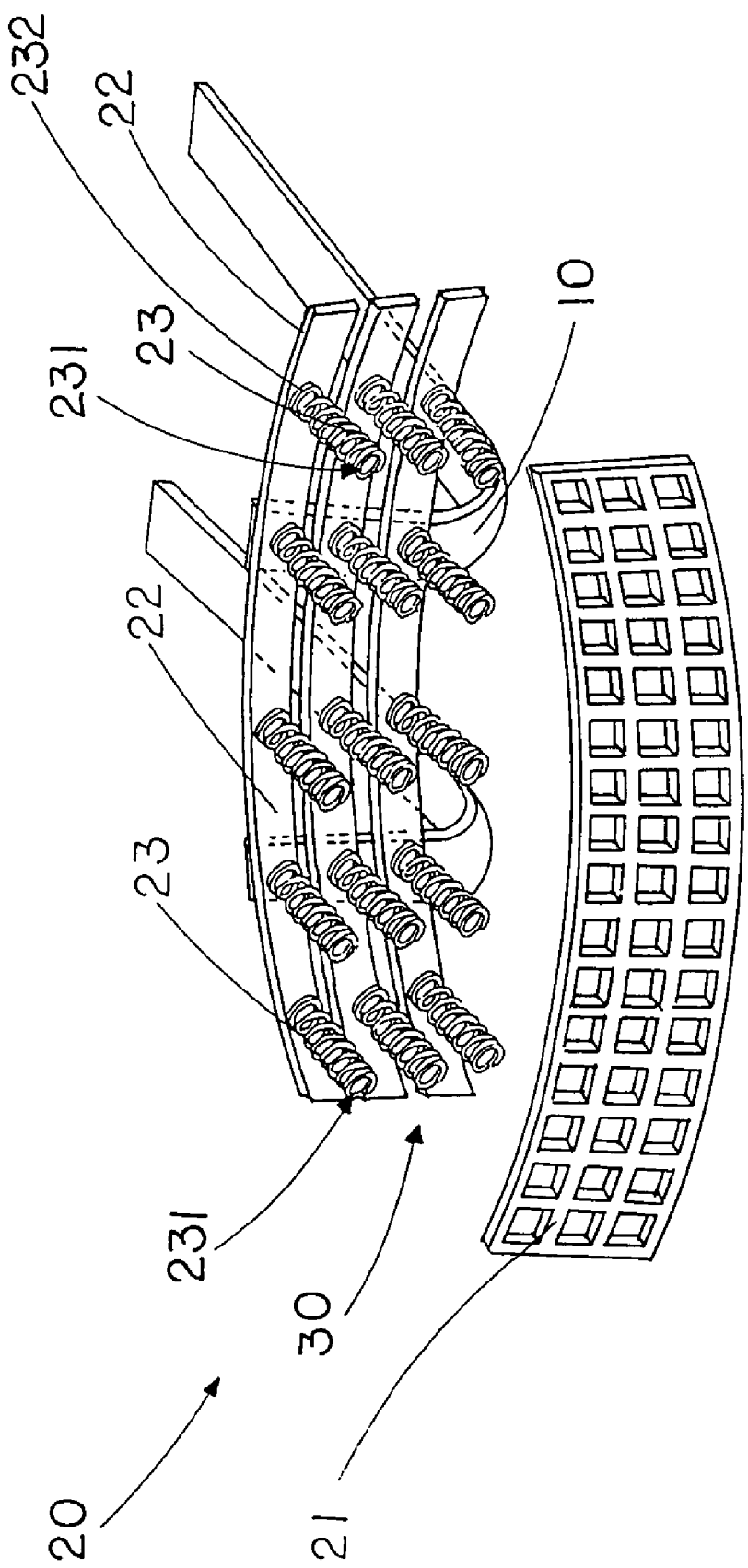
FIG. 2 is an exploded perspective view of the above anti-crash safety device according to the above preferred embodiment of the present invention.

Referring to the FIGS. 1 and 2 of the drawings, an anti-crash safety device for a vehicle according to a preferred embodiment of the present invention is illustrated. The anti-crash safety device comprises a supporting frame 10 adapted for securely mounting to a vehicle body 2 of the vehicle. As shown in FIG. 1, the anti-crash safety device is adapted to be installed at both the front end and rear end of a vehicle. In this specification, the front end anti-crash safety device is introduced for illustrative purpose.

Preferably, the supporting frame 10 is made of H-shaped rigid steel extended from the vehicle body, such as a chassis of the vehicle. According to the first preferred embodiment of the present invention, the supporting frame 10 is upwardly and frontwardly extended from the vehicle body 2.

The anti-crash safety device further comprises an impact rebounding unit 20, which is supported by the supporting frame 10 for protecting the vehicle body 2 from being crashed, wherein the impact rebounding unit 20 comprises at least a resilient reinforcing member 21 positioned spaced apart from the vehicle body 2 and defining a receiving cavity 30 between the resilient reinforcing member 21 and the vehicle body 2 for shielding at least a portion of the vehicle body 2, wherein the resilient reinforcing member 21 is adapted to retain a restoring force for bounding an impact force away from the vehicle body 2 when the impact force is applied on the resilient reinforcing member 21.

The impact rebounding unit 20 further comprises at least a shock absorbing element 23 rearwardly extended from the resilient reinforcing member 21 within the receiving cavity 30, wherein the shock absorbing element 23 is adapted for storing an urging force to absorb the impact force from the resilient reinforcing member 21 so as to minimize the impact force transmitting from the resilient reinforcing member 21 to the vehicle body 2 and to protect the vehicle body 2 from directly being crashed by the impact force.

As shown in FIG. 2, the resilient reinforcing member 21 is a curved elongated meshed shaped metal longitudinally extended with respect to the vehicle body 2 to form as a safeguard thereof. Here, the resilient reinforcing member 21 as an exterior member is disposed in a front end of the vehicle along its lateral direction. Preferably, the resilient reinforcing member 21 is made of rigid but bendable material, such that when the impact force is applied on the resilient reinforcing member 21, the resilient reinforcing member 21 is bent for bounding back the impact force. The mesh shaped resilient reinforcing member 21 is capable of reducing the wind resistance and facilitating the heat dissipation of the engine within the vehicle body 2.

Referring to FIG. 2, the shock absorbing element 23 comprises a compression spring having a coupling end 231 coupled with the resilient reinforcing member 21 and a biasing end 232 extended for biasing towards the vehicle body 2, such that when the impact force is applied on the resilient reinforcing member 21, the shock absorbing element 231 is compressed to absorb the impact force.

As shown in FIG. 2, the shock absorbing element 23 are alignedly positioned along the resilient reinforcing member 21 for absorbing the impact force therefrom. It is noted that the quantity of shock absorbing element 23 is adjustable according to the vehicle's size, shape as well as the size and shape of the resilient reinforcing member 21. The sets of shock absorbing element 23 are mechanical devices designed to smooth out a shock impulse and dissipate kinetic energy for protecting the vehicle body 2. In other words, when the impact force is applied on the resilient reinforcing member 21, the impact force is absorbed by reforming the resilient reinforcing member 21 and by compressing the shock absorbing elements 23 while both the resilient reinforcing member 21 and the shock absorbing elements 23 provide rebounding forces respectively to offset the impact force.

Here, it is noted that the intensity of the shock absorbing element 23 is adjustable, i.e. the users could choose stiffer (higher rate) springs or soft (lower rate) springs while controlling the range of rebounding strength. On the other hand, the number of resilient retention member 22 could be changed according to the intensity of shock absorbing element 23 being used.

The impact rebounding unit 20 further comprises at least one resilient retention member 22 supported by the supporting frame 10 within the receiving cavity 30 at a position behind the resilient reinforcing member 21, wherein the shock absorbing element 23 is supported within the receiving cavity 30 substantially to bias between the resilient reinforcing member 21 and the resilient retention member 22.

Figure 3A:
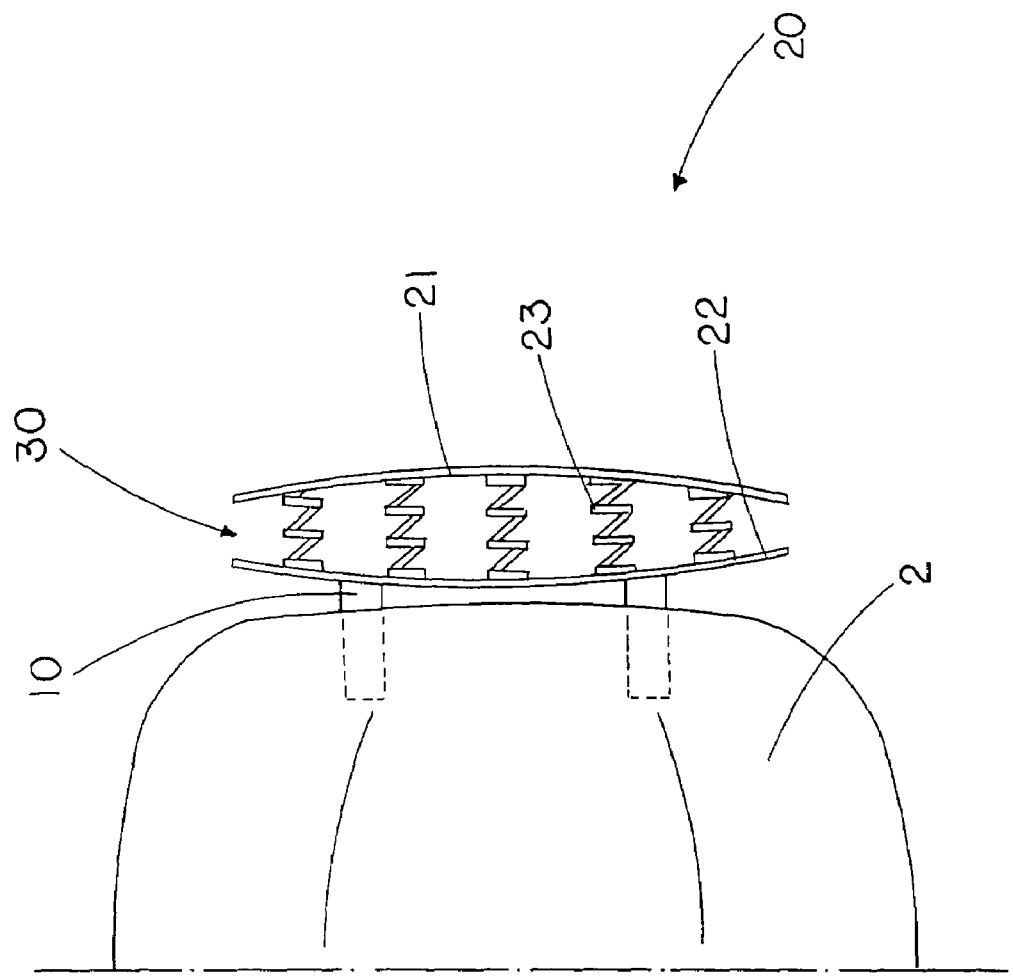
FIG. 3A is a top view of an anti-crash safety device for a vehicle according to the above preferred embodiment of the present invention.

As shown in FIG. 3A, the resilient retention member 22, which is made of rigid but bendable material, forms as a curved elongated member aligned with the resilient reinforcing member 21 to form the receiving cavity 30 having an oval shape that a distance between the resilient retention member 22 and the resilient reinforcing member 21 is gradually reducing from a mid-portion to two side portions. In other words, the resilient reinforcing member 21 and the resilient retention member 22 are respectively bent to form the oval shaped receiving cavity 30 therebetween so that when the impact force is applied the resilient reinforcing member 21 as well as the impact rebounding unit 20, the arch shaped resilient reinforcing member 21 would be deformed to create a counterforce, i.e. the rebounding force, thereby significantly reducing the impact impugned on the vehicle body 2.

The resilient retention member 22 acting as a stiffening member is supported behind the resilient reinforcing member 21. Here, the resilient retention member 22 has stiffness stronger than a stiffness of the resilient reinforcing member 21 such that the resilient retention member 22 is adapted to withstand the impact force applied to the resilient reinforcing member 21. In other words, the resilient retention member 22 is adapted to protect the vehicle body 2 by distributing an excessive impact force applied on the resilient reinforcing member 21.

According to the first preferred embodiment of the present invention, the coupling end 231 of the shock absorbing element 23 is extended from the resilient reinforcing member 21 while the biasing end 232 of the shock absorbing element 23 is extended from the resilient retention member 22. In other words, the impact force is transmitted from the resilient reinforcing member 21 to the resilient retention member 22 through the shock absorbing element 23.

Figure 3B:
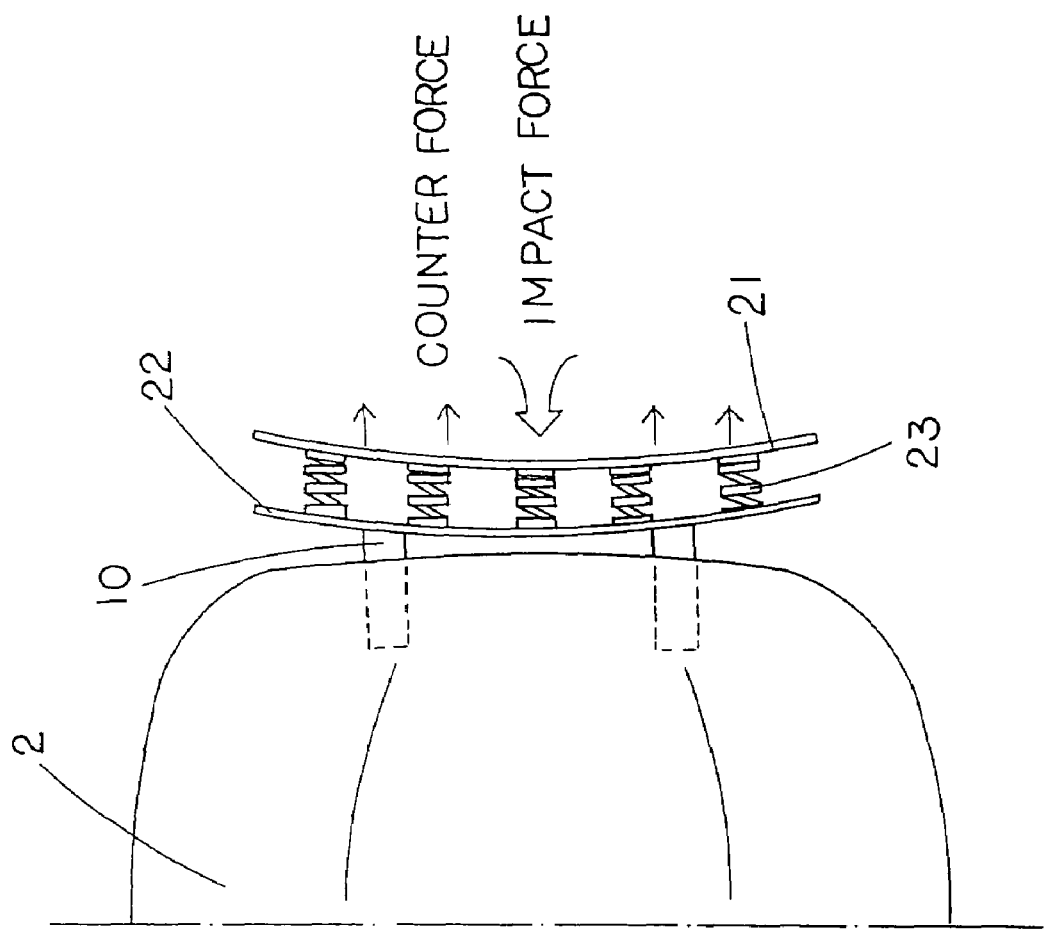
FIG. 3B is a top view of an anti-crash safety device for a vehicle according to the above preferred embodiment of the present invention illustrating an impact force applying on the anti-crash safety device.

As shown in FIG. 3B, when the impact force is applied on the resilient reinforcing member 21, the resilient reinforcing member 21 will be bent to deform its curvature so as to absorb a portion of the impact force while the rest of the impact force will transmit to the shock absorbing element 23 so as to compress the shock absorbing element 23. It is worth to mention that when the shock absorbing element 23 is compressed, the distance between the resilient reinforcing member 21 and the resilient retention member 22 is reduced. Accordingly, the total rebounding force of the resilient reinforcing member 21 and the shock absorbing element 23 may sufficient to offset the impact force when the impact force is relatively small.

Once the impact force is relatively large, the excessive impact force, which does not be offset from the resilient reinforcing member 21 and the shock absorbing element 23, will transmit to the resilient retention member 22. Therefore, the resilient retention member 22 will be bent to deform its curvature to restore a rebounding force so as to absorb the excessive impact force. It is worth to mention that the impact rebounding unit 20, i.e. the resilient reinforcing member 21, the shock absorbing element 23 and the resilient retention member 22, will provide a counter force (rebounding force) to offset the impact force. As a result, the impact rebounding unit 20 could cushion the vehicle body 2 from direct impact. In other words, the damage to the vehicles could be significantly reduced.

FIG. 4 illustrates an alternative mode of the shock absorbing element of the anti-crash safety device according to the first preferred embodiment of the present invention is illustrated. The shock absorbing element 23' comprises a Z-shaped spring having a front portion coupled with the resilient reinforcing member 21 and a rear portion extended for biasing towards the vehicle body 2, such that when the impact force is applied on the resilient reinforcing member 22, the shock absorbing element 23' is depressed to absorb the impact force.

Referring to the FIG. 5, the anti-crash safety device can be installed inside the vehicle body 2 according to the preferred embodiment of the present invention is illustrated. The impact rebounding unit 20 is positioned in front of an engine of the vehicle for shielding the engine of the vehicle from being impacted, as shown in FIG. 5. According to the preferred embodiment, the anti-crash safety device is installed between the coolant container and engine to further protect the engine as well as the vehicle occupants from being damaged. Therefore, when a compact vehicle collides with a full size vehicle, the impact rebounding unit 20 can protect the engine of the compact vehicle while the impact force is directly applied on the vehicle body 2 of the compact vehicle.

Finally, it is worth to mention that the anti-crash safety device can be built-in with the vehicle bumper such that the anti-crash safety device is hidden behind the outer side of the vehicle bumper so as to enhance the appearance of the vehicle.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. An anti-crash safety device for a vehicle having a vehicle body, comprising:

a supporting frame adapted for securely mounting to said vehicle body; and an impact rebounding unit, which is supported by said supporting frame, comprising:

at least a resilient reinforcing member positioned spaced apart from said vehicle body and defining a receiving cavity between said resilient reinforcing member and said vehicle body for shielding at least a portion of said vehicle body, wherein said resilient reinforcing member is adapted to retain a restoring force for bounding an impact force away from said vehicle body when said impact force is applied on said resilient reinforcing member;

at least a shock absorbing element rearwardly extended from said resilient reinforcing member within said receiving cavity, wherein said shock absorbing element is adapted for applying an urging force to absorb said impact force from said resilient reinforcing member so as to minimize said impact force transmitting from said resilient reinforcing member to said vehicle body and to protect said vehicle body from directly being crashed by said impact force; and at least one resilient retention member, having a stiffness stronger than a stiffness of said resilient reinforcing member, supported by said supporting frame within said receiving cavity at a position behind said resilient reinforcing member, wherein said shock absorbing element is supported within said receiving cavity substantially to bias between said resilient reinforcing member and said resilient retention member, wherein said resilient retention member, which is made of bendable material, forms as a curved elongated member aligned with said resilient reinforcing member to form said receiving cavity having an oval shape that a distance between said resilient retention member and said resilient reinforcing member is gradually reducing from a mid-portion to two side portions.

2. An anti-crash safety device for a vehicle having a vehicle body, comprising:

a supporting frame adapted for securely mounting to said vehicle body; and an impact rebounding unit, which is supported by said supporting frame, comprising:

at least a resilient reinforcing member positioned spaced apart from said vehicle body and defining a receiving cavity between said resilient reinforcing member and said vehicle body for shielding at least a portion of said vehicle body, wherein said resilient reinforcing member is adapted to retain a restoring force for bounding an impact force away from said vehicle body when said impact force is applied on said resilient reinforcing member, wherein said resilient reinforcing member, which is made of bendable material, forms a curved elongated member longitudinally extended with respect to said vehicle body to form as a safeguard thereof, such that when said impact force is applied on said resilient reinforcing member, said resilient reinforcing member is bent to deform a curvature thereof for bounding said impact force;

at least a shock absorbing element rearwardly extended from said resilient reinforcing member within said receiving cavity, wherein said shock absorbing element is adapted for applying an urging force to absorb said impact force from said resilient reinforcing member so as to minimize said impact force transmitting from said resilient reinforcing member to said vehicle body and to protect said vehicle body from directly being crashed by said impact force; and at least one resilient retention member, having a stiffness stronger than a stiffness of said resilient reinforcing member, supported by said supporting frame within said receiving cavity at a position behind said resilient reinforcing member, wherein said shock absorbing element is supported within said receiving cavity substantially to bias between said resilient reinforcing member and said resilient retention member, wherein said resilient retention member, which is made of bendable material, forms as a curved elongated member aligned with said resilient reinforcing member to form said receiving cavity having an oval shape that a distance between said resilient retention member and said resilient reinforcing member is gradually reducing from a mid-portion to two side portions.

3. The anti-crash safety device, as recited in claim 2, wherein said shock absorbing element comprises a compression spring having a coupling end coupled with said resilient reinforcing member and a biasing end extended for biasing towards said vehicle body, such that when said impact force is applied on said resilient reinforcing member, said shock absorbing element is compressed to absorb said impact force.

4. The anti-crash safety device, as recited in claim 2, wherein said shock absorbing element comprises a Z-shaped spring having a front portion coupled with said resilient reinforcing member and a rear portion extended for biasing towards said vehicle body, such that when said impact force is applied on said resilient reinforcing member, said shock absorbing element is depressed to absorb said impact force.

5. A vehicle, comprising:

a vehicle body receiving an engine therein; and an anti-crash safety device, which comprises:

a supporting frame securely mounted to said vehicle body; and an impact rebounding unit, which comprise:

at least a resilient reinforcing member supported by said supporting frame at a position spaced apart from said vehicle body and defining a receiving cavity between said resilient reinforcing member and said vehicle body to shield at least a portion of said vehicle body, wherein said resilient reinforcing member is adapted to retain a restoring force for bounding an impact force away from said vehicle body when said impact force is applied on said resilient reinforcing member, wherein said resilient reinforcing member, which is made of bendable material, forms as a curved elongated member longitudinally extended with respect to said vehicle body to form as a safeguard thereof, such that when said impact force is applied on said resilient reinforcing member, said resilient reinforcing member is bent to deform a curvature thereof for bounding said impact force;

at least a shock absorbing element rearwardly extended from said resilient reinforcing member within said receiving cavity, wherein said shock absorbing element is adapted for applying an urging force to absorb said impact force from said resilient reinforcing member so as to minimize said impact force transmitting from said resilient reinforcing member to said vehicle body and to protect said vehicle body from directly being crashed by said impact force; and a resilient retention member, having a stiffness stronger than a stiffness of said resilient reinforcing member, supported by said supporting frame within said receiving cavity at a position behind said resilient reinforcing member, wherein said shock absorbing element is supported within said receiving cavity substantially to bias between said resilient reinforcing member and said resilient retention member, wherein said resilient retention member, which is made of bendable material, forms as a curved elongated member aligned with said resilient member to form said receiving cavity having an oval shape that a distance between said resilient retention member and said resilient reinforcing member is gradually reducing from a mid-portion to two side portions.

6. The vehicle, as recited in claim 5, wherein said shock absorbing element comprises a compression spring having a coupling end coupled with said resilient reinforcing member and a biasing end extended for biasing towards said vehicle body, such that when said impact force is applied on said resilient reinforcing member, said shock absorbing element is compressed to absorb said impact force.

7. The vehicle, as recited in claim 5, wherein said shock absorbing element comprises a Z-shaped spring having a front portion coupled with said resilient reinforcing member and a rear portion extended for biasing towards said vehicle body, such that when said impact force is applied on said resilient reinforcing member said shock absorbing element is depressed to absorb said impact force.

8. The vehicle, as recited in claim 6, wherein said supporting frame is mounted to a vehicle frame of said vehicle body, wherein said impact rebounding unit is positioned in front of said vehicle body to shield a front portion of said vehicle body from being impacted.

9. The vehicle, as recited in claim 6, wherein said supporting frame is mounted to a vehicle frame of said vehicle body, wherein said impact rebounding unit is positioned in front of said engine of said vehicle for shielding said engine of said vehicle from being impacted.

10. The vehicle, as recited in claim 7, wherein said supporting frame is mounted to a vehicle frame of said vehicle body, wherein said impact rebounding unit is positioned in front of said vehicle body for shielding a front portion of said vehicle body from being impacted.

11. The vehicle, as recited in claim 7, wherein said supporting frame is mounted to a vehicle frame of said vehicle body, wherein said impact rebounding unit is positioned in front of said engine of said vehicle for shielding said engine of said vehicle from being impacted.

* * * * *